(12) United States Patent
Osicki

(10) Patent No.: US 9,004,478 B2
(45) Date of Patent: Apr. 14, 2015

(54) WELDING WORKBENCH ASSEMBLY WITH WRAPAROUND DUAL STAGE BARRIERS

(75) Inventor: David E. Osicki, Painesville, OH (US)

(73) Assignee: Lincoln Global, Inc., City of Industry, CA (US)

( * ) Notice: Subject to any disclaimer, the term of this patent is extended or adjusted under 35 U.S.C. 154(b) by 416 days.

(21) Appl. No.: 13/477,236

(22) Filed: May 22, 2012

(65) Prior Publication Data

US 2013/0312643 A1 Nov. 28, 2013

(51) Int. Cl.
*B23Q 3/00* (2006.01)
*B21J 13/08* (2006.01)
*B25H 1/20* (2006.01)
*B25H 1/02* (2006.01)

(52) U.S. Cl.
CPC ... *B25H 1/20* (2013.01); *B25H 1/02* (2013.01)

(58) Field of Classification Search
CPC ...... A47B 83/001; A47B 97/06; A47B 17/02; E04B 2/7416; E04B 2002/749; E01F 13/048; E06B 11/02; E06B 3/921; B23K 37/006; B23K 37/047; B23K 9/321; B25H 1/20
USPC ............ 52/239, 36.1; 254/10 C; 187/313; 144/286.1; 49/71, 133, 131, 127, 100, 49/25, 374, 372, 80.1, 101, 102; 108/60; 160/37; 434/420
See application file for complete search history.

(56) References Cited

U.S. PATENT DOCUMENTS

| | | | | |
|---|---|---|---|---|
| 315,250 | A * | 4/1885 | Cook | 160/132 |
| 757,179 | A * | 4/1904 | Cross | 49/102 |
| 2,944,861 | A * | 7/1960 | Lessin | 312/196 |
| 3,083,417 | A * | 4/1963 | Cook | 52/64 |
| 3,835,291 | A | 9/1974 | Sciaky | |
| 3,934,496 | A * | 1/1976 | Turko | 454/56 |
| 7,238,916 | B2 * | 7/2007 | Samodell et al. | 219/125.1 |
| 7,487,744 | B1 | 2/2009 | Goldberg | |
| 8,322,802 | B2 * | 12/2012 | Boxenbaum et al. | 312/223.3 |
| 2005/0252094 | A1 | 11/2005 | Bischof | |
| 2012/0255939 | A1 * | 10/2012 | Osicki et al. | 219/136 |

* cited by examiner

*Primary Examiner* — Lee D Wilson
*Assistant Examiner* — Jamal Daniel
(74) *Attorney, Agent, or Firm* — Pearne & Gordon LLP

(57) ABSTRACT

A welding workbench assembly comprises a base. The welding workbench assembly further comprises a first wraparound barrier comprising at least three panels, including a first panel, a second panel, and a third panel. The second panel is adjacent to the first panel at a first end of the first panel and the third panel is adjacent to the first panel at a second end of the first panel. The welding workbench assembly further comprises a second wraparound barrier comprising at least three panels, including a fourth panel, a fifth panel, and a sixth panel. The fifth panel is adjacent to the fourth panel at a first end of the fourth panel and the sixth panel is adjacent to the fourth panel at a second end of the fourth panel.

17 Claims, 3 Drawing Sheets

WELDING WORKBENCH ASSEMBLY WITH WRAPAROUND DUAL STAGE BARRIERS

FIELD OF INVENTION

The present disclosure relates to the field of welding. More particularly, the present disclosure relates to a welding workbench assembly.

BACKGROUND

Robots are commonly used in welding applications to increase weld quality and improve efficiency. A welding robot is typically positioned on or beside a table of a welding workbench and is programmed to weld a target, also placed on the table. To comply with governing safety standards, a welding workbench for a welding robot includes a barrier between the welding robot and an operator of the welding robot. In known workbenches, the barrier is above a minimum height for safety reasons. However, the barrier may obstruct an operator's ability to reach into the work area of the workbench, even when the barrier is lowered to a down position. For example, if a work area is 5 feet above ground and includes an 8 foot barrier, the barrier would still extend 3 feet above the work area when lowered to ground level.

SUMMARY OF THE INVENTION

A welding workbench assembly comprises a base. The welding workbench assembly further comprises a first wraparound barrier comprising at least three panels, including a first panel, a second panel, and a third panel. The second panel is adjacent to the first panel at a first end of the first panel and the third panel is adjacent to the first panel at a second end of the first panel. The welding workbench assembly further comprises a second wraparound barrier comprising at least three panels, including a fourth panel, a fifth panel, and a sixth panel. The fifth panel is adjacent to the fourth panel at a first end of the fourth panel and the sixth panel is adjacent to the fourth panel at a second end of the fourth panel. The welding workbench assembly further comprises a lifting apparatus coupled to the base and configured to stagger the first wraparound barrier and the second wraparound barrier vertically with respect to the base.

A workbench assembly comprises a base. The workbench assembly further comprises an inner barrier comprising at least three panels, including a first panel, a second panel, and a third panel. The second panel is connected substantially perpendicular to the first panel at a first end of the first panel and the third panel is connected substantially perpendicular to the first panel at a second end of the first panel. The workbench assembly further comprises an outer barrier comprising at least three panels, including a fourth panel, a fifth panel, and a sixth panel. The fifth panel is connected substantially perpendicular to the fourth panel at a first end of the fourth panel and the sixth panel is connected substantially perpendicular to the fourth panel at a second end of the fourth panel. The workbench assembly further comprises a lifting apparatus connected to the base and configured to stagger the inner barrier and the outer barrier and to move the inner barrier and the outer barrier vertically with respect to the base.

A workbench assembly comprises a base. The welding workbench assembly further comprises a first wraparound barrier comprising a first panel, a second panel, and a third panel. The second panel is adjacent to the first panel at a first end of the first panel and the third panel is adjacent to the first panel at a second end of the first panel. The welding workbench assembly further comprises a second wraparound barrier comprising a fourth panel, a fifth panel, and a sixth panel. The fifth panel is adjacent to the fourth panel at a first end of the fourth panel and the sixth panel is adjacent to the fourth panel at a second end of the fourth panel. The welding workbench assembly further comprises a means for staggering the first wraparound barrier and the second wraparound barrier vertically with respect to the base.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
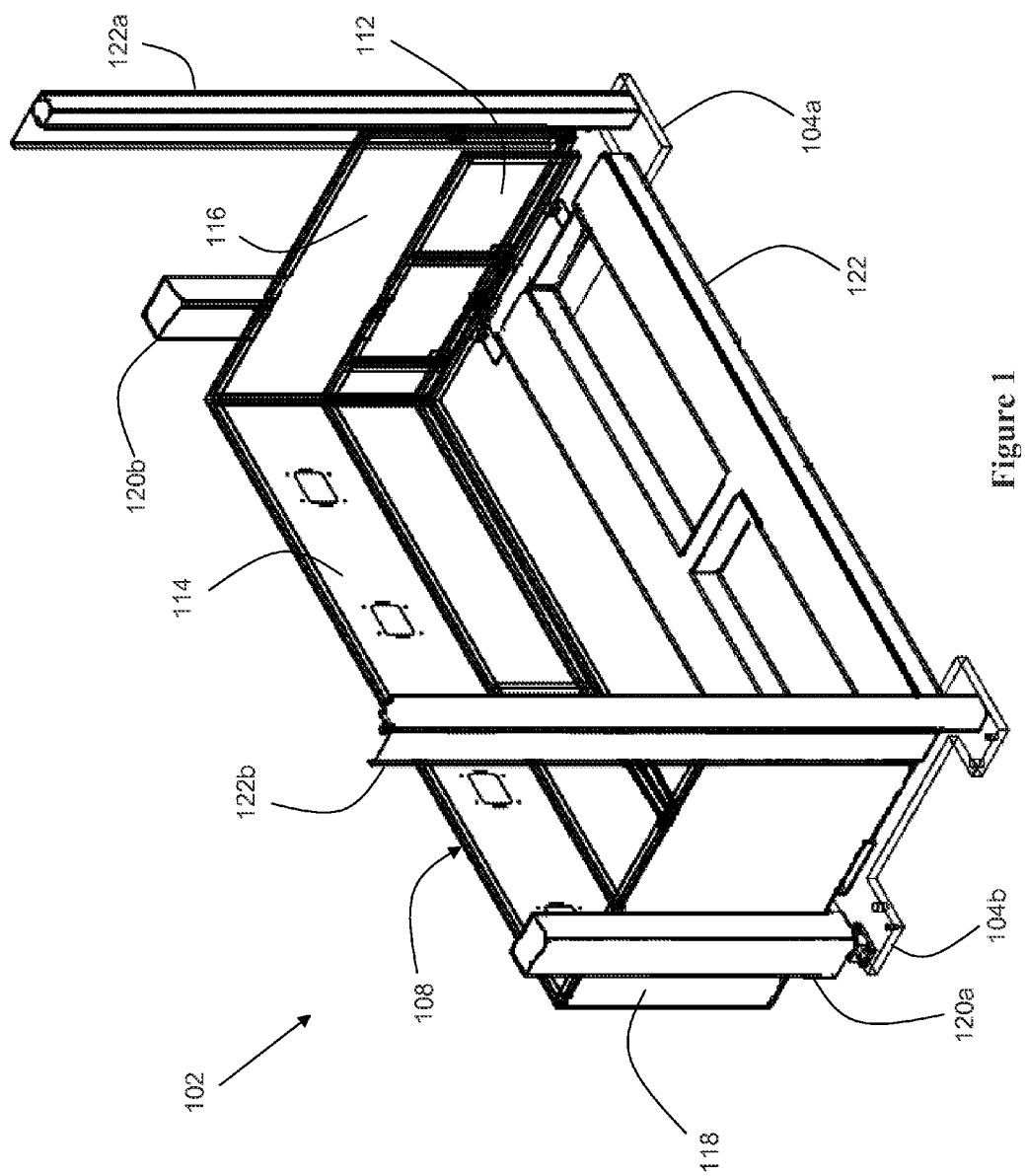
FIG. 1 illustrates a perspective view of an example welding workbench assembly with wraparound dual stage barriers.

FIG. 1 illustrates an example welding workbench assembly 102 with wraparound dual stage barriers. Welding workbench assembly 102 has a first base 104a and a second base 104b (hereinafter referred to as base 104) to provide structural support for welding workbench assembly 102. Base 104 may be configured to be secured to a floor or other flat surface. Base 104 may also be configured to stand freely without being secured to a floor or a flat surface. In an alternative embodiment (not shown), bases 104a and 104b may be combined to form a single base.

Welding workbench assembly 102 has a first wraparound barrier 106 and a second wraparound barrier 108. First wraparound barrier 106 has a first panel 110, a second panel 112, and a third panel (not shown). In an example embodiment, first panel is a center panel, second panel is right panel, and third panel is a left panel. Second panel 112 is coupled substantially perpendicular to first panel 110 at a first end of first panel 110. Third panel is coupled substantially perpendicular to first panel 110 at a second end of first panel 110. In other words, first panel 110, second panel 112, and third panel together form three of four sides of a box or cube shape. The fourth side is left exposed. In another example embodiment, first wraparound barrier 106 may have a fourth panel (not shown) to complete the fourth side of a box shape.

Second wraparound barrier 108 has three panels as well. Specifically, second wraparound barrier 108 has a fourth panel 114, a fifth panel 116, and a sixth panel 118. In an example embodiment, fourth panel is a center panel, fifth panel is right panel, and sixth panel is a left panel Fifth panel 116 is coupled substantially perpendicular to fourth panel 114 at a first end of fourth panel 114. Sixth panel 118 is coupled substantially perpendicular to fourth panel 114 at a second end of fourth panel 114. In other words, fourth panel 114, fifth panel 116, and sixth panel 118 together form three of four sides of a box or cube shape. The fourth side is left exposed.

In another example embodiment, second wraparound barrier 108 may have a fourth panel (not shown) to complete the fourth side of a box shape.

It should be understood that, although the first wraparound barrier 106 and second wraparound barrier 108 have been described as having three or four panels coupled in a substantially perpendicular manner to form a box or cube shape, the panels of a wraparound barriers may also be coupled at other angles to form other shapes. For example, three panels may be coupled to form three sides of a pentagon. In an example embodiment, the panels may be coupled at varying angles to form non-standard shapes. In an example embodiment, panels may be curved to form a circular or curved wraparound barrier. In an example embodiment, a wraparound barrier may comprise five or more panels.

The panels 110, 112, 114, 116, and 118 of first and second wraparound barriers 106 and 108 may be constructed of any suitable material such as steel, aluminum, composite, etc.

First wraparound barrier 106 is an inner wraparound barrier and second wraparound barrier 108 is an outer wraparound barrier. Second wraparound barrier 108 is positioned with respect to first wraparound barrier 106 such that second wraparound barrier 108 substantially replicates first wraparound barrier 106 wherein first panel 110 corresponds to fourth panel 114, wherein second panel 112 corresponds to fifth panel 116, and wherein third panel corresponds to sixth panel 118. Specifically, first panel 110 is substantially parallel to fourth panel 114, second panel 112 is substantially parallel to fifth panel 116, and third panel is substantially parallel to sixth panel 118. Moreover, the length of fourth panel 114 is greater than the length of first panel 110, the length of fifth panel 116 is greater than the length of second panel 112, and the length of sixth panel 118 is greater than the length of third panel. In other words, as will be referred to hereinafter, second wraparound barrier 108 is configured to at least partially overlap, or overlay, first wraparound barrier 106. In addition, first wraparound barrier 106 and second wraparound barrier 108 are configured to move vertically, substantially parallel to one another.

Welding workbench assembly 102 has a first lifting apparatus 120a coupled to first base 104a and a second lifting apparatus 120b coupled to second base 104b (hereinafter referred to as lifting apparatus 120). Lifting apparatus 120 is configured to move first wraparound barrier 106, vertically with respect to base 104, to a first predetermined height. Lifting apparatus 120 is also configured to move second wraparound barrier 108, vertically with respect to base 104, to a second predetermined height, different from the first predetermined height.

In an example embodiment, welding workbench assembly comprises optional guide rails 122a and 122b for supporting and guiding fifth panel 116 and sixth panel 118 as the panels move vertically.

Lifting apparatus 120 is configured to stagger first wraparound barrier 106 and second wraparound barrier 108. For example, lifting apparatus 120 may stagger at least one of the order or the timing of movement of the wraparound barriers. Thus, lifting apparatus 120 may be configured to move first wraparound barrier 106 to the first predetermined height before beginning to move second wraparound barrier 108 to the second predetermined height. In another example embodiment, lifting apparatus 120 may begin to move first wraparound barrier 106 and then begin to move second wraparound barrier 108 before first wrap around barrier 106 reaches the predetermined height. In another example embodiment, lifting apparatus 120 may begin to move second wraparound barrier 108 before beginning to move first wraparound barrier 106. In another example embodiment, lifting apparatus 120 may stagger the speed of movement of wraparound barriers. Thus, lifting apparatus 120 may begin to move both first wraparound barrier 106 and second wraparound barrier 108 at the same time but at different speeds. Accordingly, first wraparound barrier 106 and second wraparound barrier 108 may both reach different predetermined heights at the same time. In another example embodiment, lifting apparatus 120 may begin to move both first wraparound barrier 106 and second wraparound barrier 108 at the same time and at the same speed. Thus, first wraparound barrier 106 and second wraparound barrier 108 may reach their respective predetermined heights at different times.

Once raised to respective predetermined heights, first wraparound barrier 106 and second wraparound barrier 108 act as a single dividing barrier. By combining two overlapping wraparound barriers 106 and 108 and moving them in a staggered manner, lifting apparatus 120 creates a barrier that reaches an acceptable height when both wraparound barriers are raised, even though the height of each wraparound barrier individually is not acceptable to meet current safety standards. At the same time, staggering two wraparound barriers gives an operator an unobstructed path to easily reach over the barriers towards a work area when both wraparound barriers are lowered.

The benefit of dual, staggered wraparound barriers may be better appreciated when described in an example context. In one example, it is desired to have a barrier that extends 8 feet above a welding work area and a particular welding work area is at a height of 5 feet. A lifting apparatus may move a 4 foot tall first wraparound barrier to a position such that the bottom of first wraparound barrier is proximate to the height of the work area. The lifting apparatus may also move a 5 foot tall second wraparound barrier to a position such that the bottom of the second wraparound barrier overlaps with the top of the first wraparound barrier by one foot. Thus, in combination, the overlapping first and second wraparound barriers may extend 8 feet above a 5 foot tall work area.

Following the same example, lifting apparatus may lower both first and second wraparound barriers so that the bottoms of each are proximate to the base. In other words the top of the first wraparound barrier is about 4 feet above the base and the top of the second wraparound barrier is about 5 feet above the base. Because the work area is at a height of 5 feet, the top of the first wraparound barrier would be approximately 1 foot below the work are and the top of the second wraparound barrier would be approximately level with the work area. Thus, an operator would be able to reach over the wraparound barriers, without obstruction, and access the work area.

In an example embodiment, welding workbench assembly 102 has a support apparatus 122 coupled to base 104 and configured to support a welding table or other similar table or work area (not shown).

In an example embodiment, lifting apparatus 120 is pneumatically powered. Accordingly, first wraparound barrier 106 and second wraparound barrier 108 are raised and lowered by increasing and decreasing air pressure, respectively. In an alternative example embodiment, lifting apparatus 120 is electrically powered, by an electric motor for example. Accordingly, first wraparound barrier 106 and second wraparound barrier 108 are raised and lowered by activating the electrical motor to turn in a first and second direction, respectively. In an another alternative example embodiment, lifting apparatus 120 is hydraulic-powered. Accordingly, first wraparound barrier 106 and second wraparound barrier 108 are raised and lowered by increasing and decreasing fluid pressure, respectively.

Figure 2:
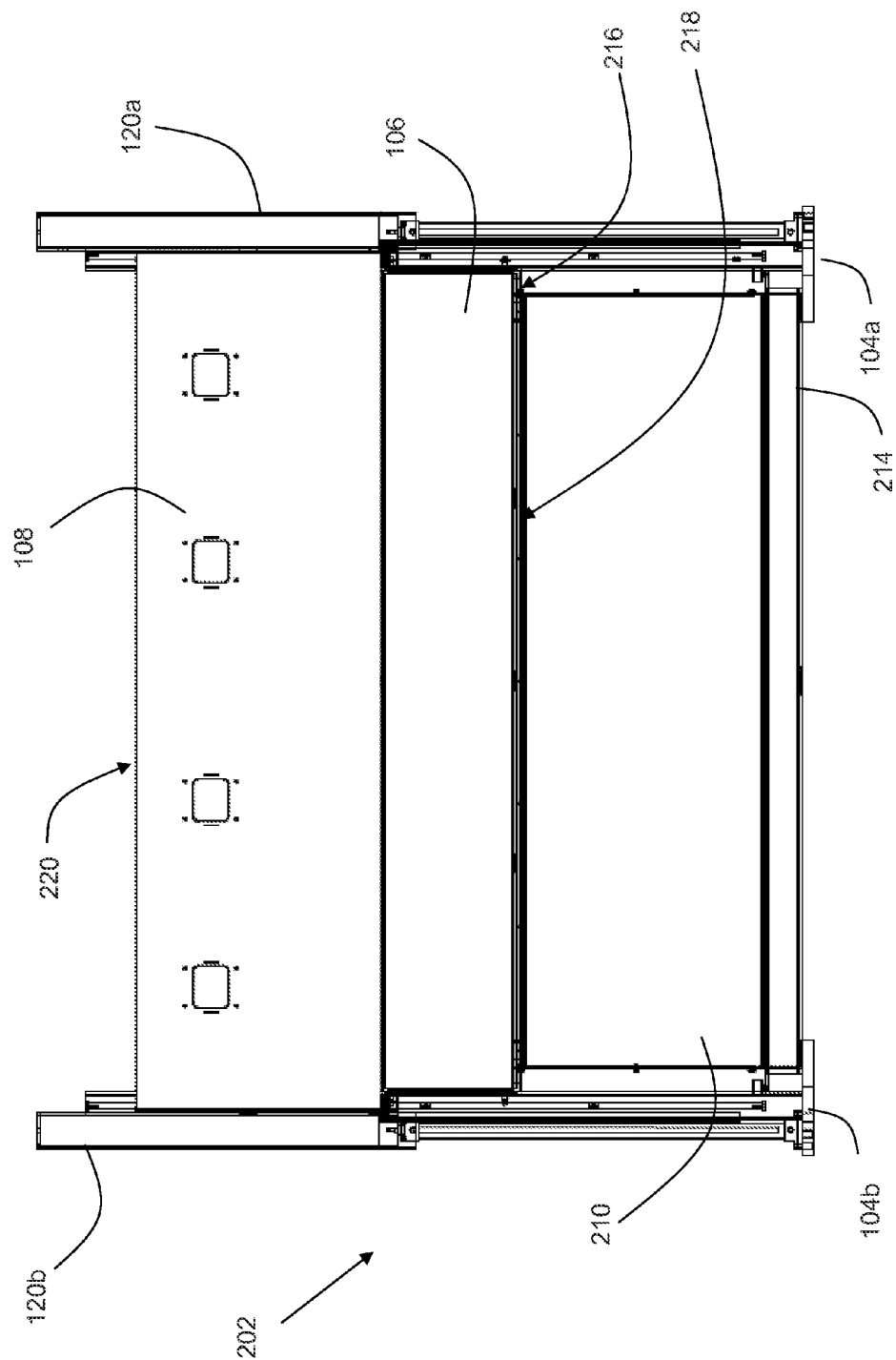
FIG. 2 illustrates a front view of the example welding workbench assembly with wraparound dual stage barriers.

FIG. 2 illustrates a front view of an example welding workbench assembly 202 with wraparound dual-stage barriers. FIG. 2 illustrates substantially the same workbench assembly as described in FIG. 1 with the following additional features. Welding workbench assembly 202 has a welding table 210 coupled to base 104 via support apparatus 214. Welding table 210 is configured to support a welding robot (not shown) or other similar welding tool for performing welding operations.

Welding workbench assembly 202 has lifting apparatus 120 coupled to base 104. Lifting apparatus 120 is configured to move first wraparound barrier 106, vertically with respect to base 104, to a first predetermined height. Lifting apparatus 120 is also configured to move second wraparound barrier 108, vertically with respect to base 104, to a second predetermined height, different from the first predetermined height.

In the front view illustrated in FIG. 2, both first wraparound barrier 106 and second wraparound barrier 108 have been raised. Specifically, first wraparound barrier 106 has been raised to a first height wherein the bottom 216 of the first wraparound barrier 106 is proximate to the top 220 of table 210. Second wraparound barrier 108 has been raised to a second height wherein the top 220 of second wraparound barrier 108 is higher than the top (not shown) of first wraparound barrier 106.

Figure 3:
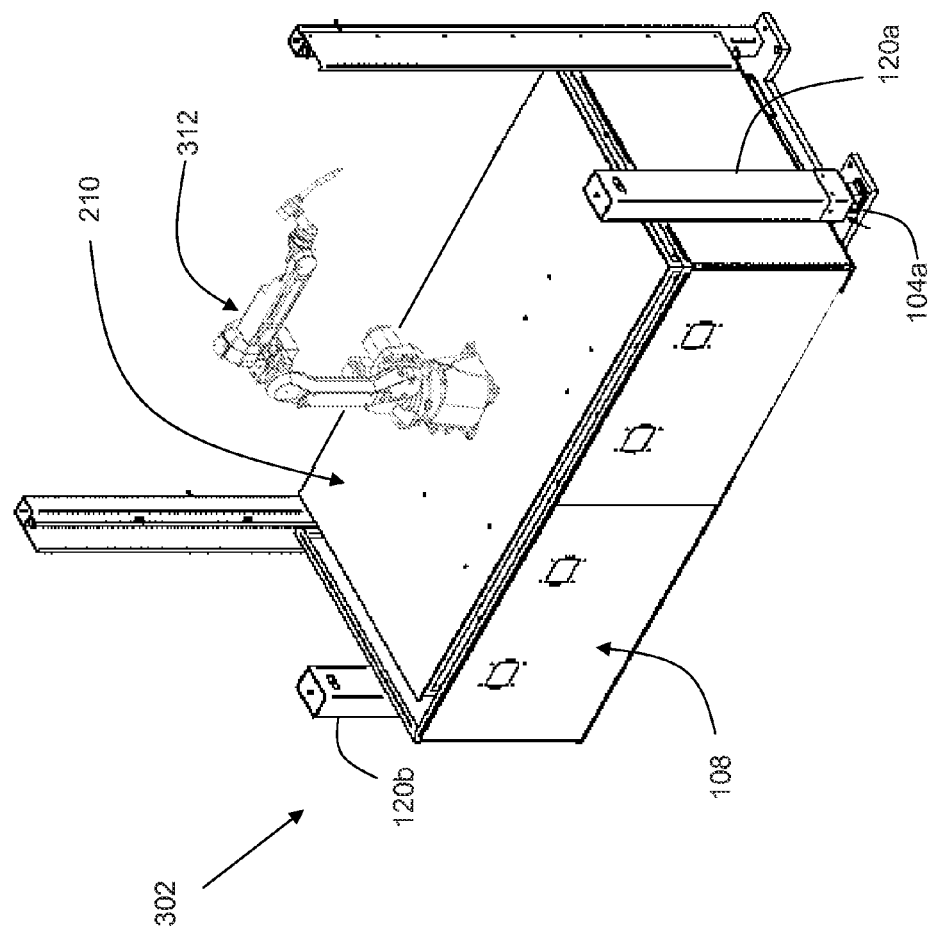
FIG. 3 illustrates another example welding workbench assembly with wraparound dual stage barriers.

FIG. 3 illustrates an example welding workbench assembly 302 with wraparound dual stage barriers. FIG. 3 illustrates another perspective of substantially the same workbench assembly as described in FIG. 1 with the following additional features. Welding workbench 302 has a lifting apparatus 102 coupled to a base 104 and configured to move a first wraparound barrier (not shown) and a second wraparound barrier 108, in a staggered manner, vertically with respect to base 104. Welding workbench 302 has a welding robot 312 disposed on welding table 210.

The Figure further illustrates both wraparound barriers in a lowered position wherein the tops of the wraparound barriers are proximate to the top of welding table 210. Such staggering and overlapping of two wraparound barriers enables an operator to have unobstructed access to welding table 210. This also enables an operator to maintain an ergonomically advantaged table height since the operator may not need to adjust the table to an uncomfortable height to allow for unobstructed access to welding robot 312 disposed on welding table 210.

It should be understood by one skilled in the art that, although workbench assembly has been described herein as being used in conjunction with a welding robot to create a barrier between an operator and a welding area on a welding table, the assembly may be used for other applications as well. For example, the two wraparound barriers may be used to create a barrier between an operator and a robot performing one or more of a variety of functions such as cutting, painting, drilling, material handling, or any other function which may require a barrier in front of an operator for safety reasons.

It should also be understood by one skilled in the art that although the assembly described herein has been described to include two staggered and overlapping wraparound barriers, an example assembly may also include three or more staggered and overlapping wraparound barriers. For example, if a barrier is to extend to a height that is more than twice the height of a work table, a third wraparound barrier may be required, staggered with two other wraparound barriers, and overlapping at least partially with at least one other wraparound barrier, in order to lower the overall combined barrier to a height that still enables an operator to have unobstructed access to the table or work area.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A welding workbench assembly comprising:
    a base;
    a first wraparound barrier comprising at least three panels, including a first panel, a second panel, and a third panel, wherein the second panel is adjacent to the first panel at a first end of the first panel and wherein the third panel is adjacent to the first panel at a second end of the first panel;
    a second wraparound barrier comprising at least three panels including a fourth panel, a fifth panel, and a sixth panel, wherein the fifth panel is adjacent to the fourth panel at a first end of the fourth panel and wherein the sixth panel is adjacent to the fourth panel at a second end of the fourth panel;
    a lifting apparatus coupled to the base and configured to stagger the first wraparound barrier and the second wraparound barrier vertically with respect to the base;
    a welding table connected to the base via a support apparatus; and
    a welding robot disposed on the table.

2. The welding workbench assembly of claim 1, wherein the lifting apparatus is configured to lift the first wraparound barrier to a first height wherein a bottom of the first wraparound barrier is proximate to a top of the table, and wherein the lifting apparatus is configured to lift the second wraparound barrier to a second height wherein a top of the second wraparound barrier is higher than a top of the first wraparound barrier.

3. The welding workbench assembly of claim 1, wherein the first panel is substantially parallel to the fourth panel, wherein the second panel is substantially parallel to the fifth panel, and wherein the third panel is substantially parallel to the sixth panel.

4. The welding workbench assembly of claim 1, wherein the second panel is substantially perpendicular to the first panel and wherein the third panel is substantially perpendicular to the first panel.

5. The welding workbench assembly of claim 1, wherein the second wraparound barrier at least partially overlaps the first wraparound barrier, wherein the length of the fourth panel is greater than the length of the first panel, wherein the length of the fifth panel is greater than the length of the second panel, and wherein the length of the sixth panel is greater than the length of the third panel.

6. The welding workbench assembly of claim 1, wherein lifting apparatus is configured to stagger at least one of the order, the timing, and the speed of movement of the first wraparound barrier and the second wraparound barrier.

7. A workbench assembly comprising:
a base;
an inner barrier comprising at least three panels, including a first panel, a second panel, and a third panel, wherein the second panel is connected substantially perpendicular to the first panel at a first end of the first panel and wherein the third panel is connected substantially perpendicular to the first panel at a second end of the first panel;
an outer barrier comprising at least three panels, including a fourth panel, a fifth panel, and a sixth panel, wherein the fifth panel is connected substantially perpendicular to the fourth panel at a first end of the fourth panel and wherein the sixth panel is connected substantially perpendicular to the fourth panel at a second end of the fourth panel;
a lifting apparatus connected to the base and configured to stagger the inner barrier and the outer barrier and to move the inner barrier and the outer barrier vertically with respect to the base;
a table connected to the base via a support apparatus; and
a robot disposed on the table.

8. The workbench assembly of claim 7, wherein the lifting apparatus is configured to lift the inner barrier to a first height such that a bottom of the first inner barrier is proximate to a top of the table, and wherein the lifting apparatus is configured to lift the outer barrier to a second height such that a top of the outer barrier is higher than a top of the first inner barrier.

9. The workbench assembly of claim 7, wherein the outer barrier substantially replicates the inner barrier such that the first panel corresponds to the fourth panel, the second panel corresponds to the fifth panel, and the third panel corresponds to the sixth panel.

10. The workbench assembly of claim 9, wherein the outer barrier at least partially overlaps the inner barrier, wherein the length of the fourth panel is greater than the length of the first panel, wherein the length of the fifth panel is greater than the length of the second panel, and wherein the length of the sixth panel is greater than the length of the third panel.

11. The workbench assembly of claim 7, wherein lifting apparatus is configured to stagger at least one of the order, the timing, and the speed of movement of the inner barrier and the outer barrier.

12. A workbench assembly comprising:
a base;
a first wraparound barrier comprising a first panel, a second panel, and a third panel, wherein the second panel is adjacent to the first panel at a first end of the first panel and wherein the third panel is adjacent to the first panel at a second end of the first panel;
a second wraparound barrier, comprising a fourth panel, a fifth panel, and a sixth panel, wherein the fifth panel is adjacent to the fourth panel at a first end of the fourth panel and wherein the sixth panel is adjacent to the fourth panel at a second end of the fourth panel;
means for staggering the first wraparound barrier and the second wraparound barrier vertically with respect to the base;
a welding table coupled to the base via a support apparatus; and
a welding tool disposed on the table.

13. The workbench assembly of claim 12, wherein the means for staggering is configured to lift the first wraparound barrier to a first height wherein a bottoms of the panels of the first wraparound barrier are proximate to a top of the table, and wherein the means for staggering is configured to lift the second wraparound barrier to a second height wherein a tops of the panels of the second wraparound barrier are higher than the tops of the panels of the first wraparound barrier, respectively.

14. The workbench assembly of claim 12, wherein the first panel is substantially parallel to the fourth panel, wherein the second panel is substantially parallel to the fifth panel, and wherein the third panel is substantially parallel to the sixth panel.

15. The workbench assembly of claim 12, wherein the first panel, the second panel, and the third panel are configured to form three sides of a box shape.

16. The workbench assembly of claim 12, wherein the length of the fourth panel is greater than the length of the first panel, wherein the length of the fifth panel is greater than the length of the second panel, and wherein the length of the sixth panel is greater than the length of the third panel, wherein the second wraparound barrier at least partially overlays the first wraparound barrier.

17. The workbench assembly of claim 12, wherein the means for staggering is configured to stagger at least one of the order, the timing, and the speed of movement of the first wraparound barrier and the second wraparound barrier respectively.

* * * * *